United States Patent [19]

Locke et al.

[11] Patent Number: 4,974,165
[45] Date of Patent: Nov. 27, 1990

[54] REAL TIME MACHINING CONTROL SYSTEM INCLUDING IN-PROCESS PART MEASURING AND INSPECTION

[75] Inventors: Dennis H. Locke, Schenectady, N.Y.; Raymond A. Kirschbaum, Bettendorf, Iowa

[73] Assignee: Mechanical Technology Incorporated, Latham, N.Y.

[21] Appl. No.: 276,787

[22] Filed: Nov. 28, 1988

[51] Int. Cl.[5] .............................................. G05B 19/19
[52] U.S. Cl. ........................... 364/474.35; 364/474.18; 364/474.34; 364/474.37; 318/572
[58] Field of Search ....................... 318/567, 568, 572; 356/372, 376; 364/474.35, 474.34, 474.37, 474.15, 474.17, 474.18, 167.01, 571.01, 474.28, 551.02

[56] References Cited

U.S. PATENT DOCUMENTS

3,902,811 9/1975 Altman et al. ...................... 356/398
4,422,150 12/1983 Keller et al. ..................... 364/474.35
4,561,776 12/1985 Pryor ..................................... 356/372
4,620,281 10/1986 Thompson et al. .................. 318/572
4,819,195 4/1989 Bell et al. ........................ 364/474.35

Primary Examiner—Jerry Smith
Assistant Examiner—Paul Gordon
Attorney, Agent, or Firm—Joseph V. Claeys; Joseph C. Sullivan

[57] ABSTRACT

A real-time machining control system is provided which includes a conventional computer numerical control and a dimensional measurement system which continually measures the actual diameter of the rotating workpiece and provides an error signal representing the difference between the actual diameter of the workpiece and that of the part program. The error signal is used to directly control the movement of the cutting tool to assure that the final actual machined profile and dimensions of the workpiece conform to the part program.

28 Claims, 5 Drawing Sheets

Fig. 2

REAL TIME MACHINING CONTROL SYSTEM INCLUDING IN-PROCESS PART MEASURING AND INSPECTION

The Government has rights to this invention pursuant to Contract No. DAAA08-83-C-0052 and DAAA08-87-C-0086 awarded by the Department of the Army.

BACKGROUND OF THE INVENTION

This invention relates generally to a machining system and method and more particularly to a new and improved real-time machining and on-machine inspection system incorporating in-process measurement of selected workpiece dimensions, such as the diameter, and directly controlling the path of the cutting tool to provide for the actual final machining of the workpiece or part to the desired dimensions prescribed by a part program.

Computer controlled machine tools which employ a computer numerical control (CNC) wherein the path of the cutting tool is directed in accordance with signals from the computer as the part program is executed are now well known and widely used. However, such known computer controlled machine tools are not always entirely satisfactory especially for automatically machining workpieces which have a narrow tolerance range. That is, such known systems are not capable of automatically machining a workpiece to assure that the final dimensions of the actually machined workpiece conform to the part program. This may result from tool wear, imperfect alignment of the workpiece in the machine tool, an offset of the cutting tool bit, thermal growth, differences in cutting tools, or the like. For example, if the workpiece is mounted in the machine tool so that its center line and the center line of the headstock and the center line of the tailstock are not perfectly in line, then with the conventional computer controlled machine tool a cylindrical workpiece will be machined with a taper. This defect can only be determined after machining by inspection, such as by hand gaging followed by remachining of the workpiece.

Methods are known in the prior art to reduce the adverse effects of tool wear and thereby improve the operation of the machining process. One such method, for example, is described in U.S. Pat. No. 4,620,281 wherein the condition of the cutting tool is monitored during a turning operation and the machine is adjusted to compensate for tool wear. The device can also be used as an in-process part inspection system. In that patent a probe on the cutting tool-tool holder assembly measures the distance to the freshly cut surface and the probe signal is monitored; when this distance changes indicating tool nose wear, the numerical control is alerted to adjust the tool during the chip-forming operation to compensate for wear. A broken or worn out tool signal shuts down the machine. After a cutting pass, the part is inspected by retracting the cutting tool and running the part program. When the measured distance is not constant, there is error in the part.

Such prior art methods can still not provide a machining system which can assure that the final profile and dimensions of the actually machined part conform to the part program within the required tolerance, which in turn conform to the intended part design. For example, the part may not be centered in the machine and since the prior art method measures only the gap between the gauge and the part these errors are indistinguishable by such methods.

The present invention for the first time provides a system and method to reliably provide for real-time, in-process measurement of actual dimensions of the workpiece during the machining operation, as well as to provide for in-process inspection of the workpiece without requiring the workpiece to be removed from the machine.

SUMMARY OF THE INVENTION

Accordingly, it is an object of this invention to provide a real-time machining system which provides for dimensional feedback control of tolerances to assure that the actual machined geometry of the workpiece is the same as that specified by the part program; a more specific object being to continually measure the workpiece diameter in real-time and provide dimensional feedback to keep the workpiece diameter within tolerances.

It is another object of this invention to provide a real-time machining system incorporating a computer control and which integrates the functions of gage calibration, dimensional feedback control of tolerances, and on-machine inspection to produce consistently higher quality parts than heretofore possible.

Briefly stated, in accordance with one aspect of the invention there is provided a control system for a machine tool in which a workpiece and a cutting tool rotate relative to one another during machining and wherein the cutting tool is positioned with respect to the workpiece by suitable driving means responsive to signals from a computer in accordance with a part program of the computer. The control system further comprises means for continually determining a selected dimension of the workpiece, such as the diameter, surface finish, or the like, and providing a real-time signal representative of the difference (error) between the actual instantaneous dimension for a given longitudinal or axial (Z-axis) position and the dimension at the corresponding position of the part program. Alternatively, the error signal provided may represent the difference between the actual instantaneous dimension for a given angular/Z-axis position ($\theta/Z$) and the dimension at the corresponding position of the part program. The error signal so provided is applied to the tool driving means for moving the cutting tool to thereby make the necessary adjustment in the position thereof to actually machine the workpiece so that its final profile and dimensions conform to the desired part program. If the conventional machine tool computer control includes tool position feedback, the error signal may be applied to modify the feedback signal, which modified signal is in turn applied to the tool driving means.

In accordance with another aspect of the invention there is provided a method of automatically machining a workpiece with a cutting tool wherein the workpiece and the cutting tool rotate relative to one another. The method comprises feeding data defining a desired profile and dimensions of the workpiece to a computer, producing from the computer a succession of digital signals defining a succession of required cutting tool positions to machine the workpiece to that profile and dimension, continually determining an actual dimension or parameter of the rotating workpiece and deriving an error signal representing the difference between said actual dimension or parameter of the workpiece and that of the part program, and feeding the error signal to means for controlling the movement of the cutting tool to assure that the final actual machined profile and dimensions of the workpiece conform to the desired part program.

In accordance with a further aspect of the invention there is provided a non-contact measuring system for determining the actual diameter of a rotating or stationary workpiece. In one embodiment the measuring system comprises a pair of spaced-apart light source units disposed adjacent to the plane of the cutting tool and directing light toward the workpiece. The system also includes a pair of corresponding, spaced-apart light sensor units disposed on the opposite side of the workpiece and arranged to receive light from the light sources. The system thus provides for a precise shadowing of the upper and lower edges of the workpiece. The signals from the light sensor units are processed to calculate the actual diameter of the workpiece. The signal processor may also be arranged to provide an indication of the surface condition (roughness) of the workpiece. With the addition of an additional optical sensor means, such as a laser point range sensor disposed on the movable longitudinal slide or carriage of the machine tool and at a fixed elevation with respect to the workpiece, the system may be arranged to measure and inspect the dimensional profile of a thread which has been machined on the workpiece and to detect flaws in the thread surface, as well as, providing an indication as to whether or not the thread is being cut properly.

BRIEF DESCRIPTION OF THE DRAWINGS

The invention will be better understood by reference to the accompanying drawings in which.

DESCRIPTION OF THE PREFERRED EMBODIMENTS

Although the invention has application in a wide range of metal removal operations, for convenience it will be described in detail with respect to a turning machine operation employing a computer controlled lathe and wherein the dimension being determined continually during the machining operation is the outside diameter of the workpiece. It should be understood however, that the term "dimension" as used in this description is not intended to be limited to the diameter of the workpiece but to include whatever process parameter it is desired to have continually determined during machining or inspection. For example, the motion of the upper and lower edges of the workpiece may be measured as the workpiece rotates thereby providing a direct measurement of the run-out of the surface of the workpiece relative to the axis of rotation of the machine.

Figure 1:
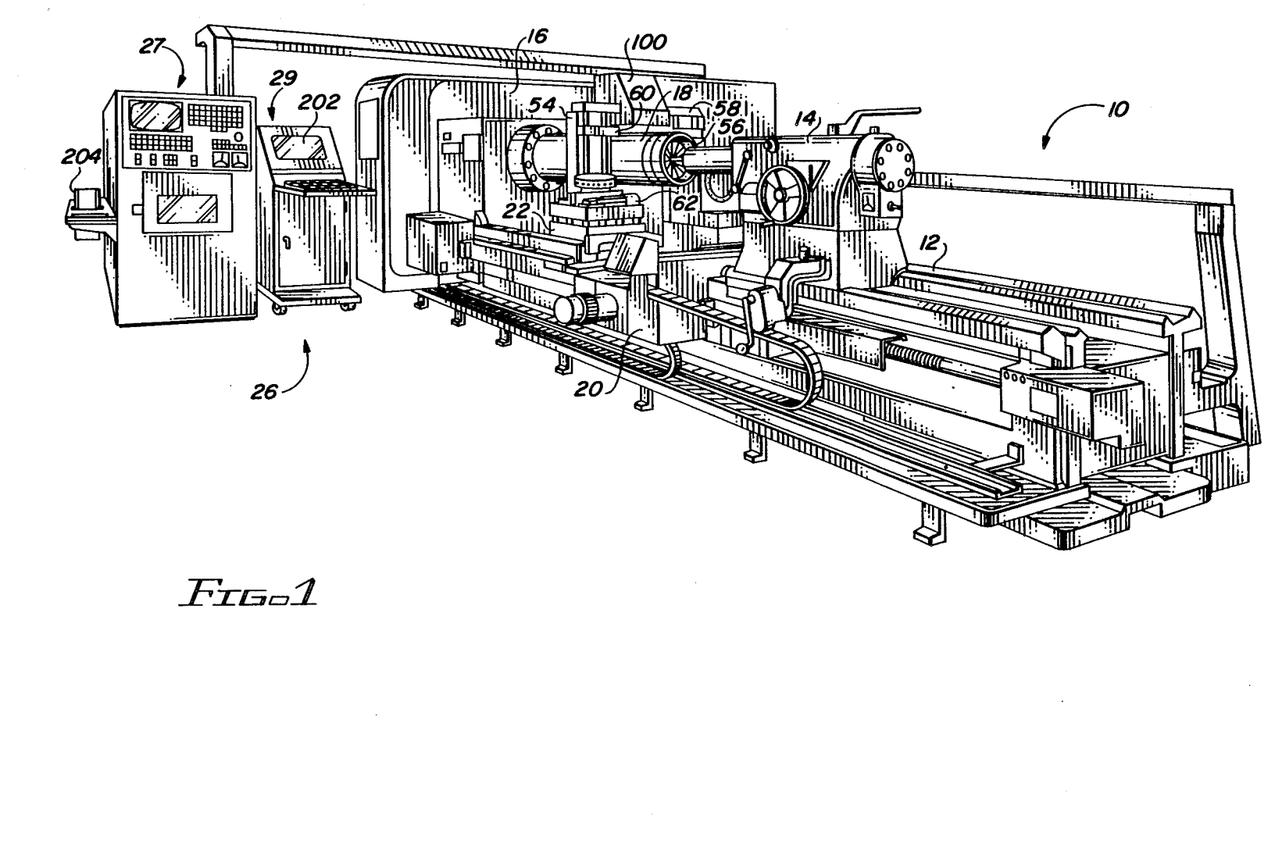
FIG. 1 is a perspective drawing of a computer controlled turning center incorporating the present invention.

In FIG. 1 there is shown a conventional type of turning center or lathe machine generally indicated at 10. Lathe 10 comprises a bed 12, a tailstock 14 adjustably mounted on the bed 12, and a headstock 16 mounted on the bed 12. Headstock 16 may be provided with specially machined calibration surfaces. Headstock 16 is provided with a suitable drive means (not shown) for rotating a workpiece 18 about a turning center lying along the longitudinal axis (Z-axis) of the lathe 10. The workpiece 18 is mounted for rotation between the headstock 16 and tailstock 14 in well known manner. Lathe 10 also includes a longitudinal slide or carriage 20 movable on the bed 12 parallel to the Z-axis. Carriage 20 carries a cross slide 22 which is movable on the carriage 20 transversely to the Z-axis. This transverse axis is referred to hereinafter as the X-axis. Cross slide 22 carries a cutting tool 24. The machining system also includes a control center generally indicated at 26 which includes a conventional computer control generally indicated at 27. The computer control 27 may be a computer numerical control such as GE Model 2000T, manufactured and sold by the General Electric Company. In accordance with this invention, the system is also provided with an operator's master control generally indicated at 29.

Figure 2:
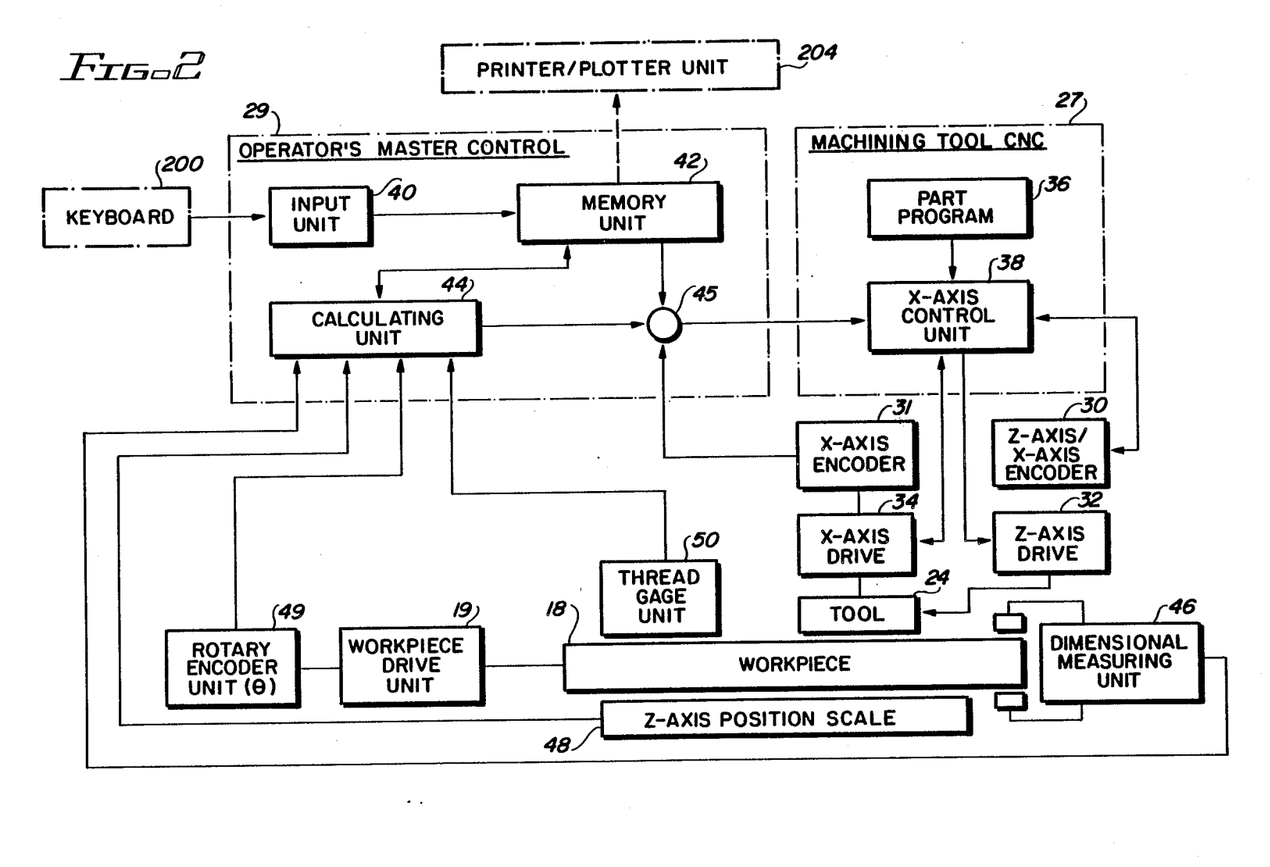
FIG. 2 is a schematic block diagram of the machining system in accordance with this invention.

As shown in FIG. 2, the machining system also includes suitable conventional Z-axis and X-axis position encoder means 30 and 31 for determining the actual Z-axis and X-axis positions of the cutting tool during machining, as well as, appropriate Z-axis and X-axis drive means 32 and 34 for causing movement of the carriage 20 and cross slide 22, respectively, in response to the control signals from the control center 26. As is well known, in existing machining operations, the computer numerical control 27 directs the path of the cutting tool as it executes the part program.

As shown in FIGS. 1 and 2, the workpiece 18 is suitably rotated by workpiece drive unit 19. The workpiece 18 is machined by a cutting tool 24 which is moved along the axis of rotation of the workpiece (the Z-axis) by a suitable Z-axis drive 32 and along the transverse axis (the X-axis) by a suitable X-axis drive 34. That is, the cutting tool 24 is moved along, as well as, toward and away from the workpiece 18. The position of the cutting tool along the Z-axis is determined by a Z-axis encoder 30. Similarly, the position of the cutting tool along the X-axis is determined by a suitable X-axis encoder 31. Z and X-axis encoders 30 and 31, respectively, may be of any conventional type well known in the art and commonly used with CNC systems. The Z-axis drive 32 can be controlled by signals produced by the control system, to move the cross slide and the cutting tool, or it can be arranged to move the cross slide and cutting tool at a fixed rate as is well known in the art. The machine tool computer numerical control 27 includes a part program 36 and an X-axis/Z-axis control unit 38.

Prior to machining, input profile and dimension data are prepared which define the required profile and dimensions of the workpiece at a succession of Z-axis positions along the workpiece. If desired the input data may be prepared to define the required profile of the workpiece at a succession of θ/Z-axis positions of the workpiece. That is, the data can define the required profile and dimensions of the workpiece at a succession of angular positions around and along the workpiece, or at a succession of only axial positions along the workpiece. The profile data is fed to an input unit 40 of the operator's master control unit 29. The operator's master control unit 29 includes a conventional microprocessor. The input fed to input unit 40 passes to a memory unit 42 and from memory unit 42 to a calculating unit 44 and to a summer 45 and then to X-axis control unit 38.

In accordance with this invention, the machining system also comprises a dimensional measuring unit 46, the output of which is fed to calculating unit 44. Calculating unit 44 also receives an input from a separate Z-axis position scale 48 which measures the position of the cutting tool along the Z-axis in well known manner. For example, the Z-axis position scale may be a linear position scale such as a "Magnascale" manufactured and sold by Sony Corporation. If the machining system is to provide for angular as well as Z-axis position data, then calculating unit 44 would also receive an input from a rotary encoder unit 48. Similarly, if the machining system is to provide for measurement of a thread on the workpiece, or to inspect the thread, then calculating unit 44 would also receive an input from a thread gauge unit 50. Calculating unit 44 will receive, as a minimum, an input from dimensional measuring unit 46 and from an additional Z-axis position scale 48. Position scale 48 provides a separate signal representing the Z-axis position of cutting tool 24 and the positions used to acquire the dimensional data. That is, it provides a Z-axis position signal in addition to that provided by Z-axis encoder 30 to the machine CNC 27. As indicated previously, it may also receive input from rotary encoder unit 49 and thread gauge unit 50. Calculating unit 44 is operative to process the signals fed to it. For example, it compares the information from scale 48 with a table Z-axis dimensions. If there is a match it issues a latch command to read all sensors. If there is a difference it feeds an error signal to summer 45.

The output of calculating unit 44 is fed to summer 45, which also receives inputs from X-axis position encoder 31 and memory unit 42. The output from the summer 45 constitutes the modified feedback control signal which is then fed to X-axis control unit 38, the output of which is fed to X-axis drive 34 to directly control the position of the cutting tool 24.

The dimensional measuring unit 46 measures the workpiece diameter continually in real time and provides dimensional feedback through calculating unit 44 and summer 45 to keep the workpiece diameter within desired tolerances. Measuring unit 46 is mounted from the carriage 20 on a bridging assembly including columns 54 and 56 and a bridge member 58 so as to straddle the workpiece 18. Briefly, dimensional measuring unit 46 provides for the continual in-process and real-time measurement of a dimension, such as a diameter, of the workpiece 18. Dimensional measuring unit 46 may include a suitable electro-optical sensor system (shown in more detail in FIG. 3) comprising oppositely disposed light source units and light sensor units. The electro-optical sensor system comprising the light source units, the light sensor units, and signal processor means may be a Defracto Model K4 sensor system, manufactured by Defracto Limited, Windsor, Ontario. The function of the sensor system is to give the distance of the edge of an object, such as a workpiece 18, from a datum, which in the Defracto K4 sensor system is the position of a light sensor including a diode array.

Figure 3:
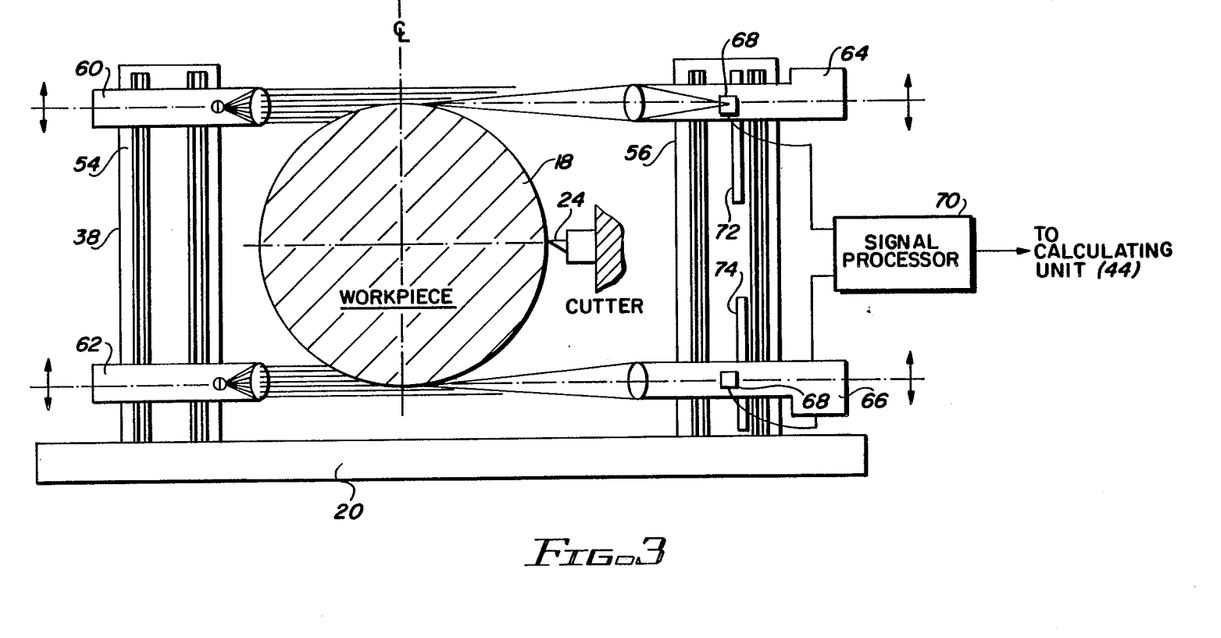
FIG. 3 is a schematic drawing of an optical dimensional measuring unit of the machining system of this invention.

As shown in FIGS. 1 and 3 the dimensional measuring unit 46 comprises spaced-apart light source units 60 and 62 movably mounted on column 54 on one side of workpiece 18, and similarly spaced-apart light sensor units 64 and 66 similarly movably mounted on the column 56 on the opposite side of workpiece 18. Each of the light sensor units 64 and 66 may contain a suitable diode array 68, the outputs of which are supplied to the signal processing unit 70 of the optical sensor system.

In accordance with this invention the light source units 60 and 62 are arranged to be moved toward and away from each other and the light sensor units 64 and 66 are arranged to be correspondingly moved toward and away from each other in unison with the movement of the light source units. Suitable linear position encoders 72 and 74 are provided in operative association with the light sensor units 64 and 66, respectively, so that the position of the light sensor units can be determined. These position encoders 72 and 74 can be any conventional linear scales well known in the art. The arrangement for moving the light source units 60 and 62 and the light sensor units 64 and 66 will be described in more detail in connection with FIGS. 4 and 5.

In operation, the workpiece 18 interrupts the light beams from the light source units 60 and 62 and a shadow is cast on the light sensitive elements in the linear arrays in the light sensor units 64 and 66. The output from the signal processor 70 of the foregoing described optical dimensional system 46 is fed to calculating unit 44, together with the separate Z-axis position signal from Z-axis position encoder 48. The calculating unit 44 calculates the workpiece diameters, compares them to stored numbers for a given position of the workpiece, such as in a look-up file, and generates compensating correction commands which are fed directly to X-axis control unit 38, the output of which is fed to X-axis drive 34 to immediately move the cutting tool 24.

Figure 4:
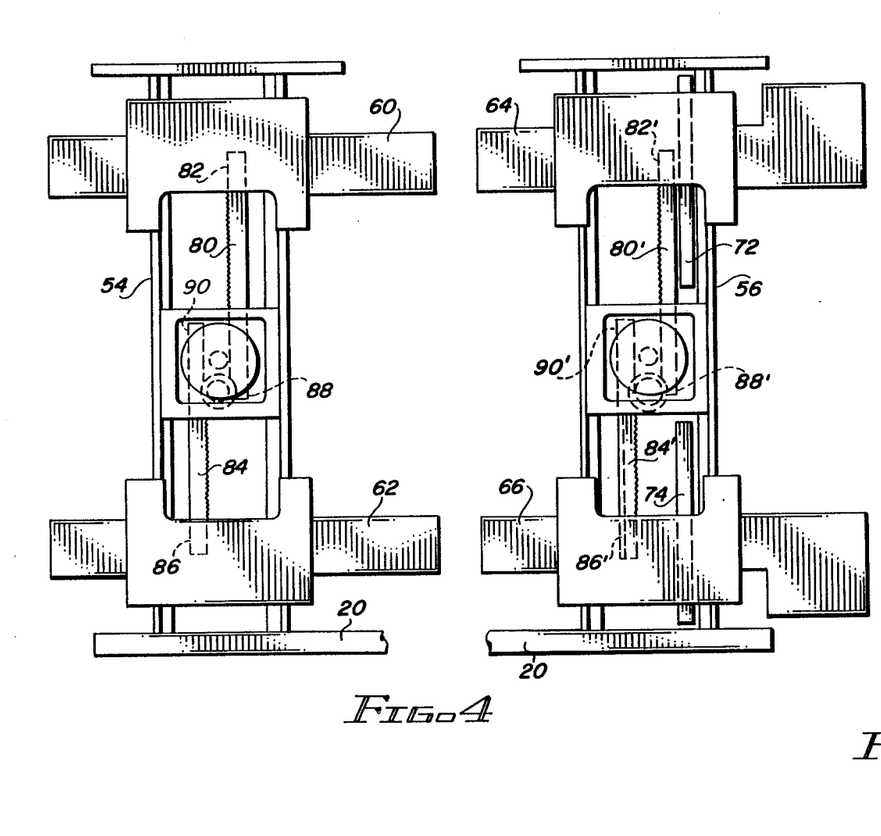
FIGS. 4 and 5 are schematic drawings of a drive arrangement for adjusting the measurement range of the optical dimensional measuring unit of FIG. 3.
Figure 5:
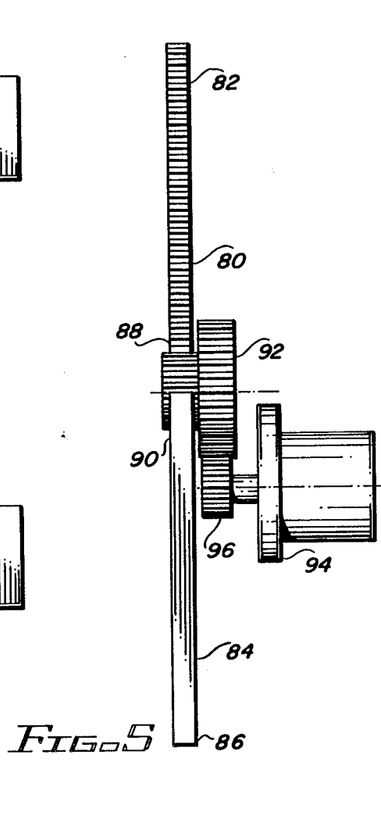

In FIGS. 4 and 5 there is shown an arrangement for moving the light source units 60 and 62 and the light sensor units 64 and 66 correspondingly and in unison so as to allow for the dimensional measurement of workpieces of various sizes. As shown, a gear rack 80 has one end 82 connected to the light source unit 60. Similarly, a gear rack 84 has one end 86 connected to the light source unit 62. The other end 88 of gear rack 80 and the other end 90 of gear rack 84 are arranged to mesh with a drive gear 92. The arrangement also includes a stepping motor 94 having a pinion gear 96 connected to the shaft thereof. Pinion gear 96 meshes with the drive gear 92 to drive the gear racks 80 and 84 and the light source units associated therewith in opposite directions. The arrangement thus provides for a motor-gear drive means to move the light source units 60 and 62 toward or away from each other depending on the direction of rotation of the stepping motor 92.

A similar drive arrangement is provided to move light sensor units 64 and 66. For example, one end 82' of a gear rack 80' is connected to light sensor unit 64 and one end 86' of a gear rack 84' is connected to the light sensor unit 66. The other ends 88' and 90' of gear racks 80' and 84' mesh with a drive gear 92' A pinion gear 96' connected with the stepping motor 94' meshes with the drive gear 92' to drive the gear racks 80' and 84' and associated light sensor units 64, 66 in opposite directions.

To provide for the simultaneous movement of the light source units 60 and 62 and the light sensor units 64 and 66 control signals are applied in common to each of the stepping motors 94 and 94'.

The present invention also includes an accurate "on-machine" thread profile and surface condition measurement, detector and inspection system and method. The system measures the dimensional profile of the thread, detects flaws in thread surface, and provides a signal to alert the machine operator if the thread is not being properly cut.

Figure 6:
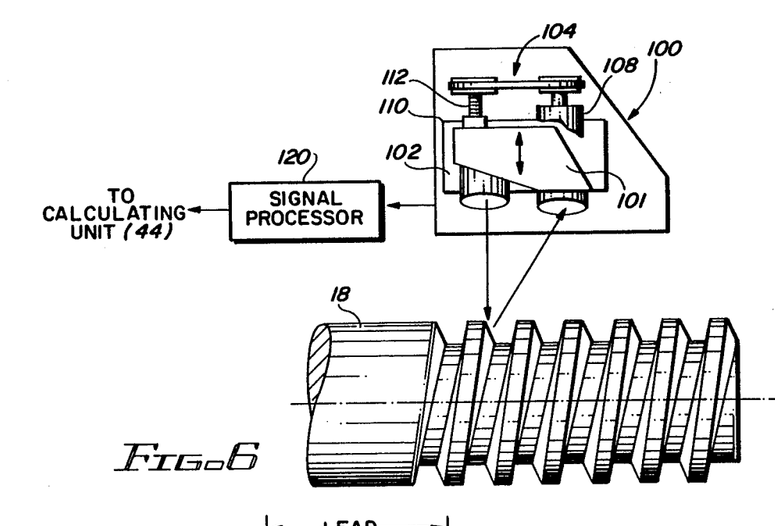
FIG. 6 is a schematic drawings of an optical thread profile measuring unit of the machining system of this invention.

As shown in FIG. 6, the thread profile and surface condition measurement, detector and inspection system comprises an optical sensor unit 100 containing an optical detector 101 adjustably mounted on a slide 102 within unit 101. Optical detector 101 may be a point range sensor manufactured and sold by CyberOptics, Minneapolis, Minnesota. The point range sensor is an optical ranging system which is capable of measuring very small displacements over a limited range.

In accordance with the system and method of this invention the thread is first treated to providefor uniform light scattering and reflection such as by spraying or coating with a dilute solution of DEYCUM White. The point range sensor unit 100 is mounted on the bridging member 58 between the two structural columns 54 and 56 which carry the light source units 60 and 62 and the light sensor units 64 and 66. The sensor unit 100 is moved across the thread profile at a fixed elevation. The elevation of the optical detector 101 is controlled by a motor drive means 104 under control of the part program. Any Suitable arrangement of drive means may be employed, such as a belt-pulley arrangement as illustrated. A stepping motor 108 responsive to a control signal from the operator's master control actuates the drive arrangement 104 and drives a lead screw 112. The lead screw 112 is fixed to the nut 110 of detector 101. The foregoing drive means 104 allows the detector 101 to be moved over a desired range, such as for example 6 inches. When not in use the lenses of the detector 101 are protected by a shutter (not shown) that is closed in response to a signal from the part program applied to drive means 104.

The sensor unit 100 projects an intense spot of visible near infra-red laser light onto the thread. This small spot on the thread is imaged onto a two dimensional detector 101 within the sensor unit 100 and relayed to signal processing means 104 where the image information is processed to produce range information, which is fed to calculating unit 44.

Figure 7:
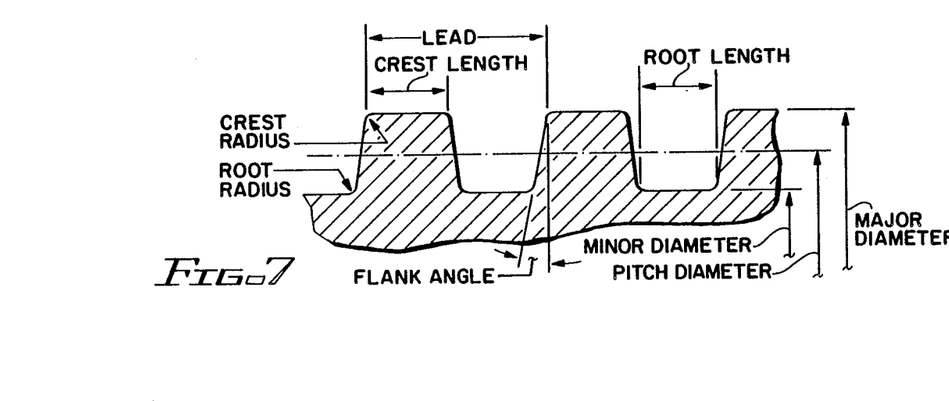
FIG. 7 is a schematic diagram illustrating the thread profile dimensions being measured by the optical thread profile measuring unit.

In operation since the point range sensor unit 100 is attached to the bridging member 58 which in turn is mounted from the carriage 20 the sensor moves with the carriage. The beam of the sensor is aimed downward and passes through the centerline of the machine. As the carriage 20 moves the optical sensor unit over the thread, the sensor signal processor 120 transmits data to the calculating unit 44 of the control system where it is converted to thread profile dimensions as shown in FIG. 7. This dimensional data allows the operator to determine if the thread is cut properly while the part is still on the machine. An additional feature of the system of this invention is the provision in the control system software of a set of simultaneous equations which are used in conjunction with the sensor measurements to inform the operator if the cutting tool is properly set up before the thread is finished. As previously indicated, the light scattering property of the turned thread flank is made uniform and consistent by initial surface treatment, such as by spraying a dilute mixture of 1 part DYCUM WHITE to 10 parts of a thinner such as acetone, onto the workpiece as the workpiece rotates at low speed, such as, for example, 100 to 200 surface feet per minute.

The operator's master control 29 provides a means for controlling the dimensional measuring systems, interfacing with the computer numerical control, interfacing with the machine tool drive systems, and provides the operator with a keyboard and a monitor to interact and program the in-process control system. The master control 29 receives commands from the part program 36 as well as, dimensional information from the dimensional measuring unit 46 and from the separate Z-axis position scale 48 and calculates the workpiece dimensions and controls such dimensions in real time. The system can also measure the thread profile dimensions and prepare an inspection report.

A keyboard 200 gives the operator access to the system and allows for manual running of both the dimensional measuring unit 46 and the thread profile measurement and detector system 50. A monitor 202 presents the operator with a menu from which functional options can be selected. When the system is in a closed loop mode, the required diameter at a specific Z-axis point on the workpiece is extracted from the part program by the system software and compared to the measured diameter from the dimensional measuring unit 46. The dimensional measurement unit 46 and the thread profile measurement unit 50 are read when the Z-axis position scale 48 indicates that the carriage has reached one of the prescribed coordinate locations in the system input file. Deviations in diameter are converted by the computer of the operator's master control 29 into a pulse train which activates the X-axis drive 34. The computer controls the output of the X-axis drive 34 so that the workpiece diameter is kept very close to the middle tolerance range. The control system software starts the machining cycle by automatically calibrating both the dimensional measuring unit 46 and the thread profile measurement unit 50 to standards that are integral components of the system fixturing. The software also causes the outside diameters and the thread profile to be inspected by the measurement units 34 and 50 and an inspection report to be generated by the printer 204.

Figure 8:
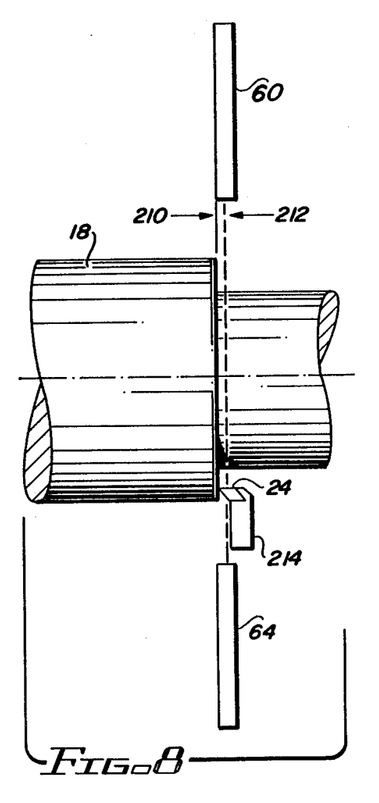
FIG. 8 is a schematic drawing which illustrates the relationship between the plane of the cutting tool and the plane of the dimensional measurement system.

As shown more clearly in FIG. 8, the plane 210 of the tip of the cutting tool 24 is a small distance in front of the plane 212 of the measurement system 46. The feed direction of cutting tool 24 along the Z-axis can be either from right to left or from left to right with appropriate design and positioning of the holder 214 for the cutting tool 24.

In accordance with the present invention the computer numerical control (CNC) is used in the conventional manner to direct the path of the cutting tool as it executes the part program. The diameter of the workpiece is measured in real-time and compared with the diameter of the part program at the corresponding position on the workpiece and producing an error signal which is applied directly to the X-axis drive means to move the cutting tool to eliminate the error. A look-up file may be employed to implement the comparison. The invention therefore provides for the first time an in-process, real-time machining system and method which assures that the final profile and diameter of the actually machined workpiece conform to the part program within the required tolerance range.

The computer numerical control therefore is used simply to calculate the required tool positions based on the part program. This allows the conventional CNC to be used in the conventional manner to control the machining. The cutting tool position is modified by a closed loop control system in accordance with actual real-time dimensional information so that the final profile and dimensions of the workpiece conform exactly to those of the part program.

There has been described in the foregoing a unique accurate and fast on-machine dimensional measuring and control system. The dimensional measuring system measures the workpiece diameter continually in real-time and provides dimensional feedback to keep the workpiece diameter within tolerances The workpiece interrupts light beams from the optical sensor system and the shadow is cast on the light sensitive elements of light sensor units disposed on the opposite side of the workpiece. The control system calculates the part diameters, compares them to stored numbers and generates compensating correction commands which are immediately executed by the machine tools X-axis drive.

By use of the optical sensing system allows for a suitable standoff distance is possible while maintaining a high resolution. For example, in one specific embodiment the standoff distance was 8.5 inches and the resolution was 50 micro inches. Also, the signal processor 44 calculates the part diameter, typically plus or minus 0.0002 inches on a 14 inch diameter workpiece. Typically, the plane of measurement is determined by the separate electronic Z-axis encoder 48 to a resolution of 50 micro inches. The workpiece diameter is obtained from the part program and is fed to the operator's master control 29. If the measured diameter of the part does not agree with the workpiece diameter, the operator's master control 29 issues a command to directly move the cutting tool thereby causing errors to be corrected immediately. Typically such errors are corrected within about 22 microseconds for a 14 inch diameter workpiece. The optical dimensional measuring unit 46 can take measurements to the order of 0.0001 inches, on the fly, and at surface speeds of several thousand feet per minute. Further the optical dimensional measuring unit 46 can have a large standoff distance which provides a margin of safety from chips and other contact damage. The system can maintain part tolerances because the X-axis control unit 38 is interfaced directly with the machine tool drive circuit and therefore can reposition the cutting tool usually in less than one revolution of the part. The X-axis control unit 38 can be a motor driven resolver, a motor driven optical encoder or their equivalent electrical circuits.

There has also been described an accurate unique on-machine thread profile dimensional measurement and inspection system which can also detect flaws in the thread surface. The thread profile measuring unit measures the dimensional profile of a thread, detects flaws in the thread surface and provides a signal to inform the operator if the thread is not being cut properly. A laser sensor is moved across the thread profile at a fixed elevation. The elevation is controlled by a motor driven slide under part program control. Based on the triangulation principal, the optical sensor measures changes in elevation which the sensor software translates into the dimensional features of the thread, including surface flaws. A single fixed orientation laser sensor can be used because of the unique surface preparation of the thread which provides for uniform light scattering and reflection to the receiving lens of the laser sensor. Typically the laser sensor has a resolution of 50 micro inches. When the laser sensor is not being used its lenses are protected by a shutter that is closed under control of the operator's master control 29.

The thread profile measurement and inspection system provides an accurate dimensional profile of the thread in a short time period and while the part is still on the machine. While illustrated with respect to the measurement and inspection of an OD thread, it should be understood that the same principle can be used to measure ID threads. By using the dimensional measuring system 46 with the machining control system of this invention, the major diameter of the workpiece can be established accurately. Also, by using the same dimensional measuring unit to monitor the minor diameter one thread behind the thread cutting tool, the pitch diameter can be maintained with a high level of accuracy. Further, the thread profile measurement and inspection system allows an accurate determination of the orientation of the thread cutting tool thus preventing an improper thread from being generated. The control system software solves a set of simultaneous equations that inform the operator of any errors that might have occurred during the set up of the thread cutting tool.

While the invention has been particularly shown and described with reference to preferred embodiments thereof, it will be understood that various changes in form and details may be made thereto without departing from the spirit and scope of the invention. The appended claims therefore are intended to cover all such changes and modifications as fall within the true spirit and scope of the invention.

What is claimed is:

1. An in-process machining control for a machining system of the type which includes means for rotating a part to be machined, a cutting tool, and a computer control having a part program providing signals for controlling the position of the cutting tool in accordance with said part program, comprising:
   measuring means for continually determining an instantaneous actual dimension of the rotating part immediately behind the tip of said cutting tool and providing an actual dimension signal representative of the instantaneous actual dimension of said part at a given Z-axis position;
   means for comparing said actual dimension with said part program and producing an error signal representative of the difference between said instantaneous actual dimension of said part and that of said part program; and
   means responsive to said error signal for adjusting the position of said cutting tool to cause said part to be actually machined in accordance with said part program.

2. The in-process machining control recited in claim 1, wherein said measuring means provides an actual dimension signal representative of the instantaneous actual dimension of said part at a given $\theta/Z$ position.

3. The in-process machining control recited in claim 2, wherein the actual dimension continually determined by said measuring means is a diameter of said part.

4. The in-process machining control recited in claim 1, wherein the actual dimension continually determined by said measuring means is a diameter of said part.

5. The in-process machining control system recited in claim 1, wherein said measuring means for continually determining the actual dimension of said part comprises an electro-optical detector and signal processing means responsive to the output of said detector for calculating the actual dimension of said part.

6. The in-process machining control recited in claim 5, wherein said electro-optical detector comprises a pair of spaced-apart light sensor units disposed in the plane of said cutting tool and a pair of spaced-apart light source units arranged to project light toward said part and said light sensor units so as to shadow the upper and lower edges of said part.

7. The in-process machining control recited in claim 1, wherein said means for comparing said actual dimension with said part program and producing an error signal includes a look-up file.

8. The in-process machining control recited in claim 7, wherein said look-up file contains a plurality of desired workpiece dimensions each representing the dimension at a specific Z-axis position along the workpiece.

9. The in-process machining control recited in claim 7, wherein said look-up file contains a plurality of desired workpiece dimensions each representing the dimension at a specific $\theta/Z$ position along the workpiece.

10. An in-process machining control for a machining system of the type which includes a bed, means for rotating a part to be machined, a longitudinal slide, a cross slide carrying a cutting tool, a computer numerical control having a part program and providing output signals, a position feedback signal for modifying said computer output signals and providing control signals for controlling the position of the cutting tool in accordance with said part program, comprising:
non-contact detector means for continually determining an instantaneous actual dimension of the rotating part immediately behind the tip of said cutting tool and providing an actual dimension signal representative of the instantaneous actual dimension of said part at a given Z-axis position;
means for comparing said actual dimension with said part program and producing an error signal representative of the difference between said instantaneous actual dimension of said part and said part dimension for the corresponding Z-axis position;
means responsive to said error signal for modifying said position feedback signal; and
X-axis drive means responsive to said modified position feedback signal to cause said cutting tool to be moved so that said part is actually machined in accordance with said part program.

11. The in-process machining control recited in claim 10, wherein said non-contact detector means for continually determining the actual dimension of said rotating part comprises an electro-optical detector and signal processor means responsive to the output of said detector for calculating the actual dimension of said part.

12. The in-process machining control recited in claim 11, wherein said electro-optical detector comprises a pair of spaced-apart light source units arranged to project light toward said part so as to shadow the upper and lower edges of said part, and a plurality of spaced-apart light sensor units disposed in the plane of said cutting tool and opposite said light source units for receiving light from said light sources.

13. The in-process machining control recited in claim 10, wherein said non-contact detector means provides an actual dimension signal representative of the instantaneous actual dimension of said part at a given $\theta/Z$ position.

14. An in-process machining control for a machining system of the type which includes means for rotating a part to be machined, a cutting tool, a computer control having a part program and providing tool position output signals, a position feedback for modifying said tool position output signals and providing a control signal for controlling the position of the cutting tool in accordance with said part program, comprising:
non-contact detector means for providing signals representative of the upper and lower edges of the rotating part immediately behind the tip of said cutting tool and at a given Z-axis position;
signal processor means responsive to the signals from said detector means for providing an actual diameter signal representative of the instantaneous actual diameter of said part;
means for comparing said instantaneous actual diameter signal with said part program and producing an error signal representative of the difference between the instantaneous actual diameter of said part and the desired part dimension for the corresponding Z-axis position;
means responsive to said error signal for modifying said feedback control signals; and
X-axis drive means responsive to said modified feedback control signal to cause said cutting tool to be moved whereby said part is actually machined in accordance with said part program.

15. The in-process machining control recited in claim 14, wherein said non-contact detector means provides signals representing the upper and lower edges of the rotating part immediately behind the tip of the cutting tool and at a given $\theta/Z$ position.

16. The in-process machining control recited in claim 14, wherein said detector means comprises an electro-optical detector disposed in the plane of said cutting tool.

17. The in-process machining control recited in claim 16, wherein said electro-optical detector means comprises first and second vertically spaced-apart light source units disposed in the plane of said cutting tool and arranged to direct light toward said part so as to shadow the upper and lower edges of said part, and first and second vertically spaced-apart light sensor units disposed in the plane of said cutting tool opposite said light source units and arranged for receiving light from said first and second light source units respectively.

18. The in-process control recited in claim 17, including first and second linear position encoder means one operatively associated with each of said first and second light sensor units for measuring the positional movement of each of said light sensor units.

19. The in-process machining control recited in claim 17, further including means for moving said first and second light source units in unison toward and away from each other and means for correspondingly moving said first and second light sensor units in unison toward and away from each other whereby said electro-optical detector means can accommodate a desired range of sizes of workpieces.

20. The in-process control recited in claim 19, including first and second linear position encoder means one operatively associated with each of said first and second light sensor units for measuring the positional movement of each of said light sensor units.

21. The in-process machining control recited in claim 19, wherein said means for moving said first and second light source units comprises a pair of spaced-apart, parallel disposed, oppositely directed gear racks one having an end connected with said first light source unit and the other having an end connected with said second light source unit, a drive gear meshing with the other end of each of said gear racks, a stepping motor; a pinion gear connected to said motor and meshing with said drive gear for moving said first and second light source units toward and away from each other depending on the direction of rotation of said pinion gear; and wherein said means for moving said first and second light sensor units comprises a pair of spaced-apart, parallel disposed, oppositely directed gear racks one having an end connected with said first light sensor unit and the other having an end connected with said second light sensor unit, a drive gear meshing with the other end of each of said gear racks, a stepping motor; a pinion gear connected with said motor and meshing with said drive gear for moving said light sensor units toward and away from each other depending on the direction of rotation of said pinion gear, and means for applying an electrical control signal in common to each of said stepping motors whereby said first and second light source units and said first and second light sensor units are correspondingly moved in unison to accommodate a desired range of sizes of workpiece.

22. The in-process machining control recited in claim 21, including first and second linear position encoder means one operatively associated with each of said first and second light sensor units for measuring the positional movement of each of said light sensor units.

23. An electro-optical measuring system, comprising:
first and second spaced-apart light source units arranged to direct light toward a body the limits of a parameter of which is to be measured so as to shadow the edges of said body which define the limits of said parameter;
first and second spaced-apart light sensor units disposed opposite said first and second light source units for receiving light therefrom, signal processor means responsive to the output of said light sensor units for calculating said parameter; and
means for simultaneously and correspondingly moving said light source units and said light sensor units toward and away from each other to accommodate a range of sizes of the body to be measured.

24. The electro-optical measuring system recited in claim 23, including means for moving said first and second light source units in unison toward and away from each other, and means for correspondingly moving said first and second light sensor units in unison toward and away from each other whereby said electro-optical measuring system can accommodate a desired range of sizes of the body to be measured.

25. The electro-optical measuring system recited in claim 24, wherein the parameter to be measured is the diameter of a horizontally disposed body and wherein said first and second light source units are vertically spaced-apart so as to shadow the upper and lower edges of said body and wherein said first and second light sensor units are similarly vertically spaced-apart.

26. The system recited in claim 24, wherein the parameter to be measured is the motion of the upper and lower edges of the part as the part rotates thereby providing a direct measurement of run-out of the part surface relative to the axis of rotation of the machine.

27. A system for measuring the profile of a thread on a body, comprising:
optical ranging sensor means disposed at a preselected elevation with respect to the body and the thread to be measured and providing an output;
drive means connected with said optical ranging sensor means for moving said optical ranging sensor means across the profile of said thread;
means responsive to the output of said optical ranging sensor means for measuring changes in elevation of the thread as said optical ranging sensor means moves along said body; and
means responsive to the measured changes in elevation for translating said changes into actual dimensional features of the thread.

28. A method of measuring the profile of the surface of a body having a thread thereon, comprising:
coating the surface of the body with a material to make light scattered from said surface uniform;
moving an optical ranging sensor means at a fixed elevation along the surface of said body to provide an output;
calculating from the output of said optical ranging sensor means the changes in elevation along the surface of said body; and
translating and calculated changes in elevation into actual dimensional features of said thread.

* * * * *